United States Patent [19]

Duclos

[11] Patent Number: 5,577,928
[45] Date of Patent: Nov. 26, 1996

[54] HERMAPHRODITIC ELECTRICAL CONTACT MEMBER

[75] Inventor: Jean-Louis Duclos, Elancourt, France

[73] Assignee: Connecteurs Cinch, Montigny Le Bretonneux, France

[21] Appl. No.: 416,628

[22] Filed: Apr. 5, 1995

[30] Foreign Application Priority Data

May 3, 1994 [FR] France ................... 94 05384

[51] Int. Cl.$^6$ ................................... H01R 13/11
[52] U.S. Cl. ........................... 439/290; 439/293
[58] Field of Search ................ 439/284, 290–291, 439/293, 851

[56] References Cited

U.S. PATENT DOCUMENTS

| | | | |
|---|---|---|---|
| 3,083,345 | 3/1963 | Scheller | 439/291 |
| 4,403,821 | 9/1983 | Zimmerman, Jr. et al. | 439/291 |
| 4,564,259 | 1/1986 | Vandame | 439/290 |
| 4,734,052 | 3/1988 | Vandame | 439/293 |
| 5,106,324 | 4/1992 | Natsume . | |
| 5,266,046 | 11/1993 | Bogiel | 439/291 |
| 5,281,175 | 1/1994 | Chupak et al. . | |
| 5,350,321 | 9/1994 | Takenouchi | 439/851 |
| 5,443,592 | 8/1995 | Ittah et al. | 439/851 |

FOREIGN PATENT DOCUMENTS

| | | | |
|---|---|---|---|
| 0152312 | 8/1985 | European Pat. Off. . | |
| 0463608 | 1/1992 | European Pat. Off. . | |
| 2559624 | 8/1985 | France . | |
| 2613878 | 10/1988 | France | 439/851 |
| 2647602 | 11/1990 | France . | |

*Primary Examiner*—Stephen P. Garbe
*Attorney, Agent, or Firm*—Greenblum & Bernstein, P.L.C.

[57] ABSTRACT

A hermaphroditic electrical contact member has a channel section body having a floor wall extended to form a male tongue, two lateral walls and a ceiling wall. A resilient contact arm extends in the channel. The ceiling wall is formed by an extension of each of the lateral walls, each extension being bent to lie parallel to the floor wall and the two extensions being then in a common plane. At least one of the extensions is joined by a lug to a point midway along the length of the resilient contact arm. Along this lug, the resilient contact arm is bent so as to lie inside the channel.

6 Claims, 5 Drawing Sheets

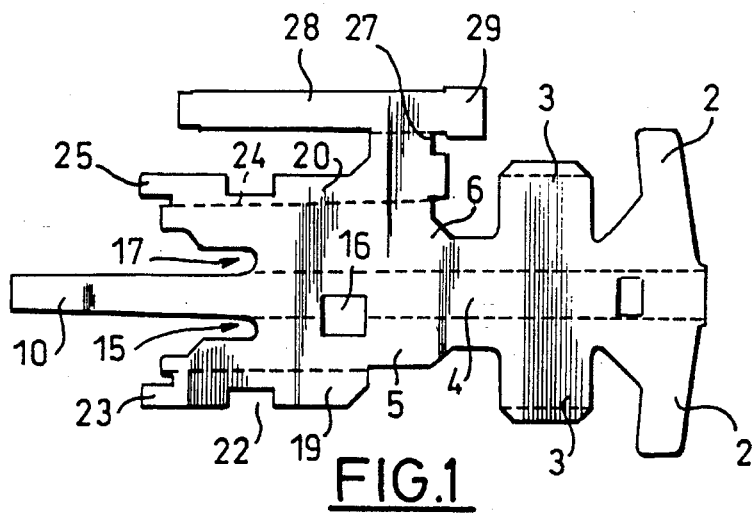
FIG.1
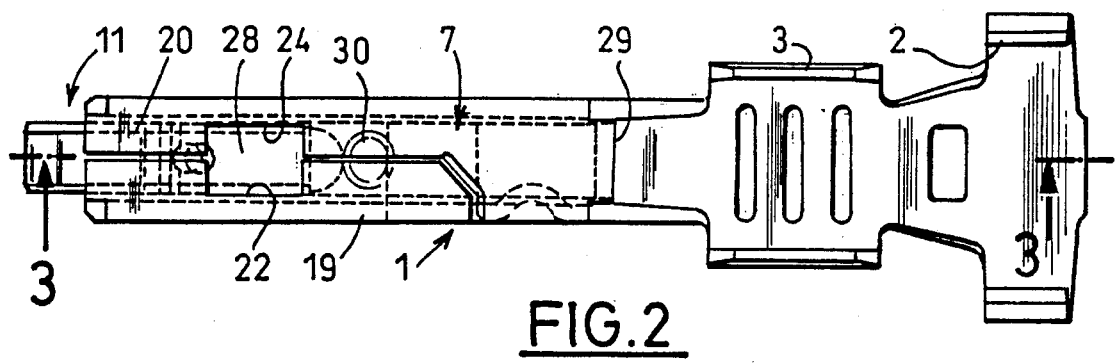
FIG.2
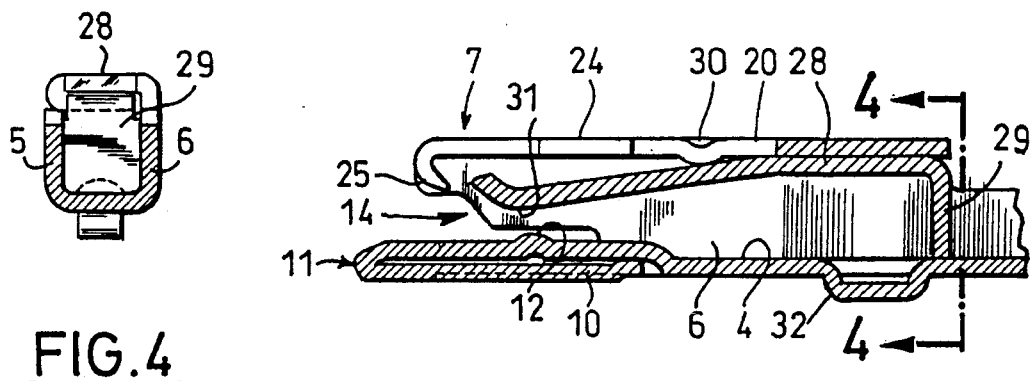
FIG.4
FIG.3

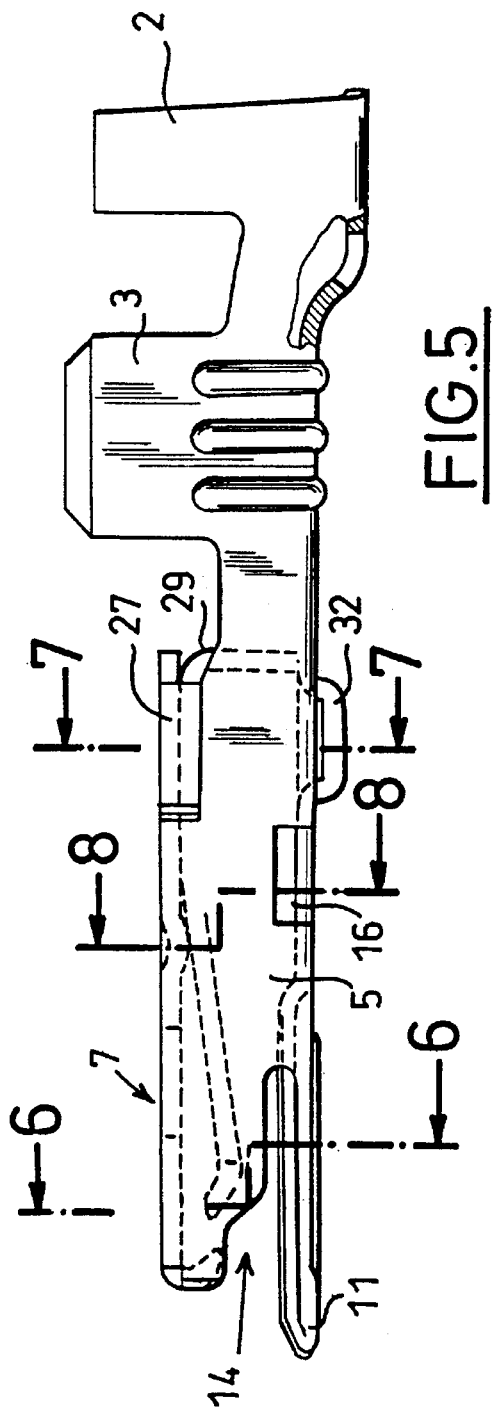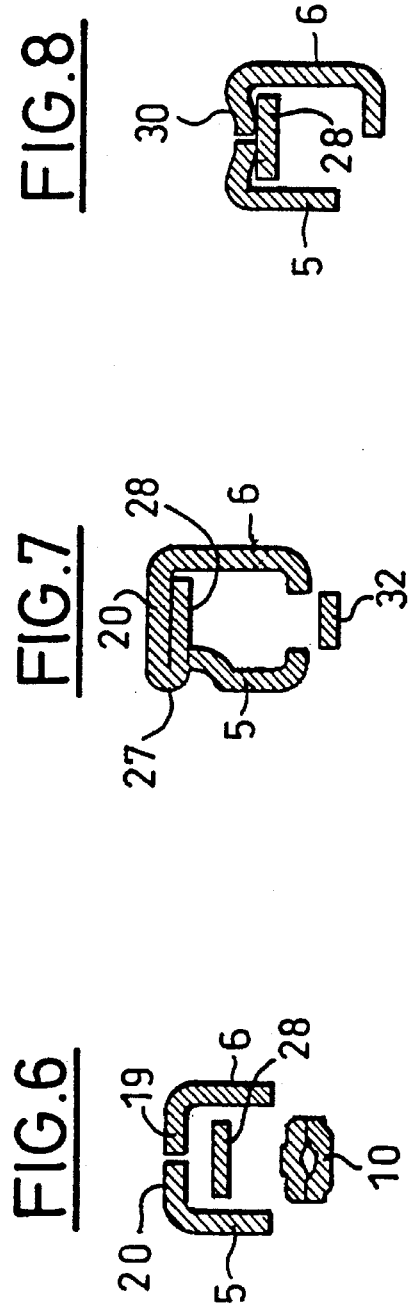

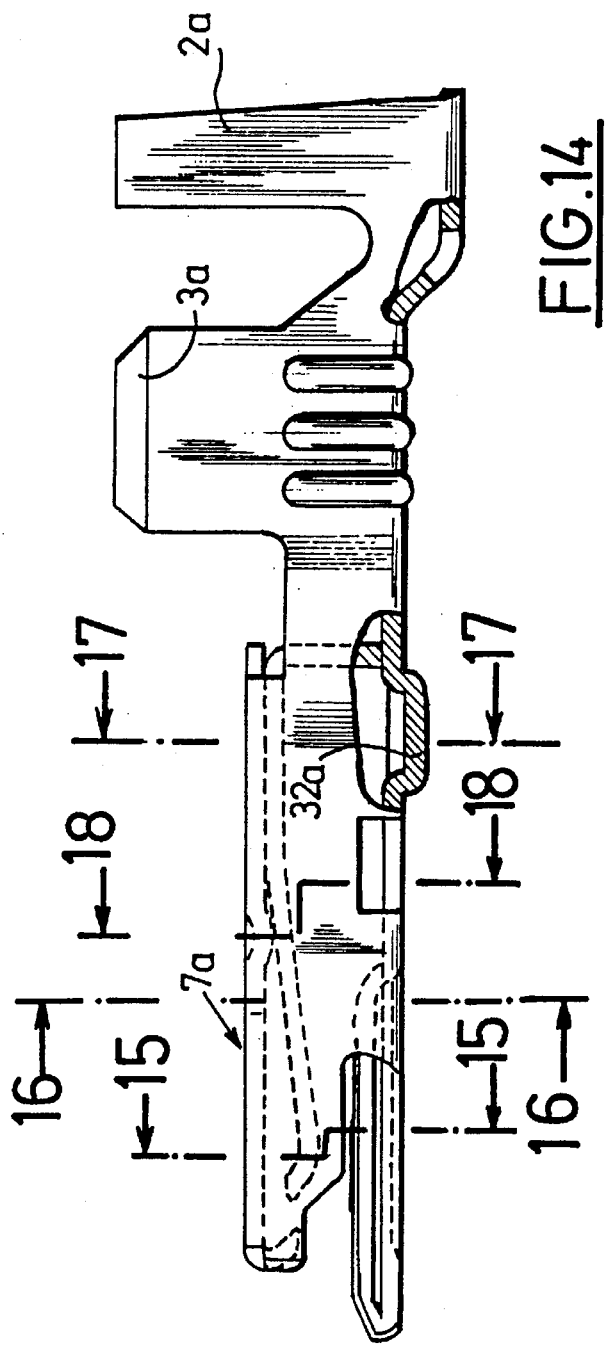
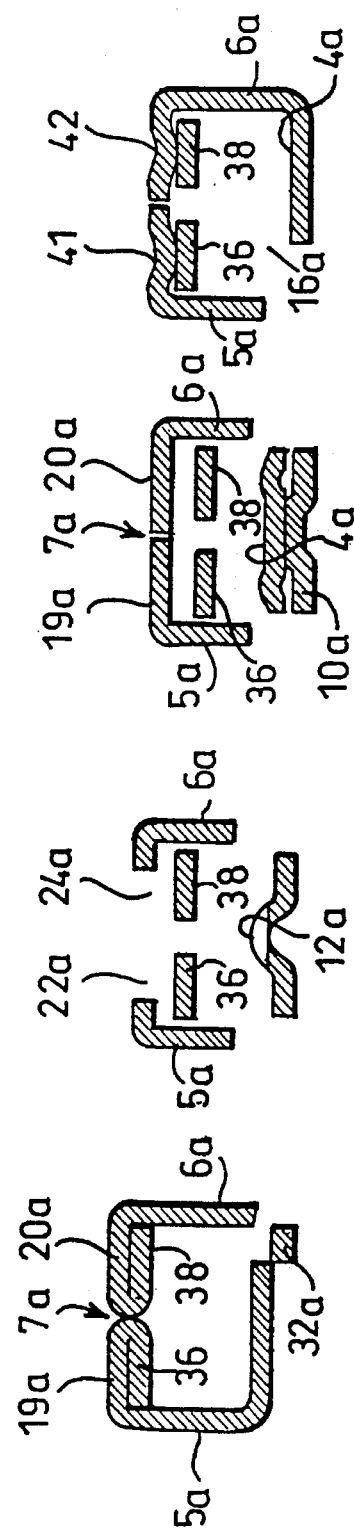

HERMAPHRODITIC ELECTRICAL CONTACT MEMBER

BACKGROUND OF THE INVENTION

1. Field of the Invention

The present invention concerns a hermaphroditic electrical contact member.

The invention is directed to an electrical contact member having a rectangular channel-section body one end of which includes means for fixing it to an electrical conductor and the other end of which is adapted to cooperate with a reversed and inverted identical member.

2. Description of the Prior Art

Various contact members of this type are known. French patent no. 2 559 624 describes a contact member of this kind which includes a channel delimited by a floor wall, two lateral walls and a ceiling wall, the floor wall being extended by a strip having a first section bent into the channel and pressed against the floor wall to form a male tongue, a second section inclined towards the opposite side of the floor and a third section bent hairclip fashion to form a resilient contact arm.

A member of this kind provides a good electrical connection but is costly because the length of the strip is such that there is significant wastage when it is cut out from a metal blank.

Also, the thickness of the part forming the male tongue is often insufficient and the tongue is not very rigid. Finally, because of its great length, the resilient contact arm is lacking in elastic force.

One object of the present invention is to remedy these drawbacks.

SUMMARY OF THE INVENTION

The invention consists in a hermaphroditic electrical contact member having a rectangular channel section body with at one end means for fixing an electrical conductor, said body having a floor wall extended at the end opposite said electrical conductor fixing means to form a male tongue, two lateral walls and a ceiling wall, a resilient contact arm extending in said channel, said ceiling wall being formed by an extensions of each of said lateral walls, each extension being bent to extend parallel to said floor wall and both extension then lying in a common plane, at least one of said extensions being joined by a lug to a point partway along the length of said resilient contact arm, the latter being bent along said lug to lie inside said channel and curved so that its free end is directed towards said male tongue.

At the same end as said electrical conductor fixing means said resilient contact arm is preferably extended by a plate which is bent to mate with the inside face of said lateral walls and said floor wall in order to close of said channel. This closes the channel to limit insertion of the electrical conductor and also to prevent sealing material flowing into the channel when sealed connectors are made.

In accordance with another feature of the invention at the end opposite said electrical conductor fixing means said extensions include guides bent towards the interior of said channel. This prevents insertion of a male tongue that is too thick and facilitates guidance of the male tongue, the arm being thereby protected.

The ceiling wall preferably includes a stamped portion forming a projection inside the channel against which the resilient contact arm abuts. This enhances the resilient action of the arm and the deflection of the arm can be varied according to the position or the depth of the stamped portion.

The ceiling wall includes an opening to facilitate fixing of the contact member in a casing element.

An opening can be provided in the floor wall and a lateral wall to receive a complementary fixing member.

In accordance with one constructive feature of the invention, the tongue is formed by a strip extending the floor wall at the end opposite the electrical conductor fixing means, the strip being bent against the outside face of the floor wall.

The strip and the corresponding part of the floor wall are preferably stamped.

In accordance with one constructive feature of the invention, the tongue has a boss inside the channel and the resilient contact arm has a corresponding boss.

In one embodiment of the invention each extension, along its free edge, is joined by a lug to a resilient contact arm bent against the inside face of the respective extension and curved so as to extend towards the tongue. This yields an electrical contact member having two spring wedging strips, which enhances the electrical connection.

Finally, the floor wall includes an external projection constituting a polarizer member to prevent incorrect insertion of the contact member into a housing of a casing.

The invention will now be described in more detail by way of non-limiting example only with reference to specific embodiments of the invention shown in the appended drawings.

BRIEF DESCRIPTION OF THE DRAWINGS

FIG. 1 is a plan view showing how a metal blank is cut out to form the hermaphroditic electrical contact member of the invention.

FIG. 2 is a plan view of the member made from the FIG. 1 blank.

FIG. 3 is a view in section on the line 3—3 in FIG. 2.

FIG. 4 is a view in section on the line 4—4 in FIG. 3.

FIG. 5 is an elevation view.

FIG. 6 is a view in section on the line 6—6 in FIG. 5.

FIG. 7 is a view in section on the line 7—7 in FIG. 5.

FIG. 8 is a view in section on the line 8—8 in FIG. 5.

FIG. 14 is a partially cut away elevation view of the contact member in this embodiment.

FIG. 15 is a view in section on the line 15—15 in FIG. 14.

FIG. 16 is a view in section on the line 16—16 in FIG. 14.

FIG. 17 is a view in section on the line 17—17 in FIG. 14.

FIG. 18 is a view in section on the line 18—18 in FIG. 14.

DETAILED DESCRIPTION OF THE INVENTION

Figure 9:
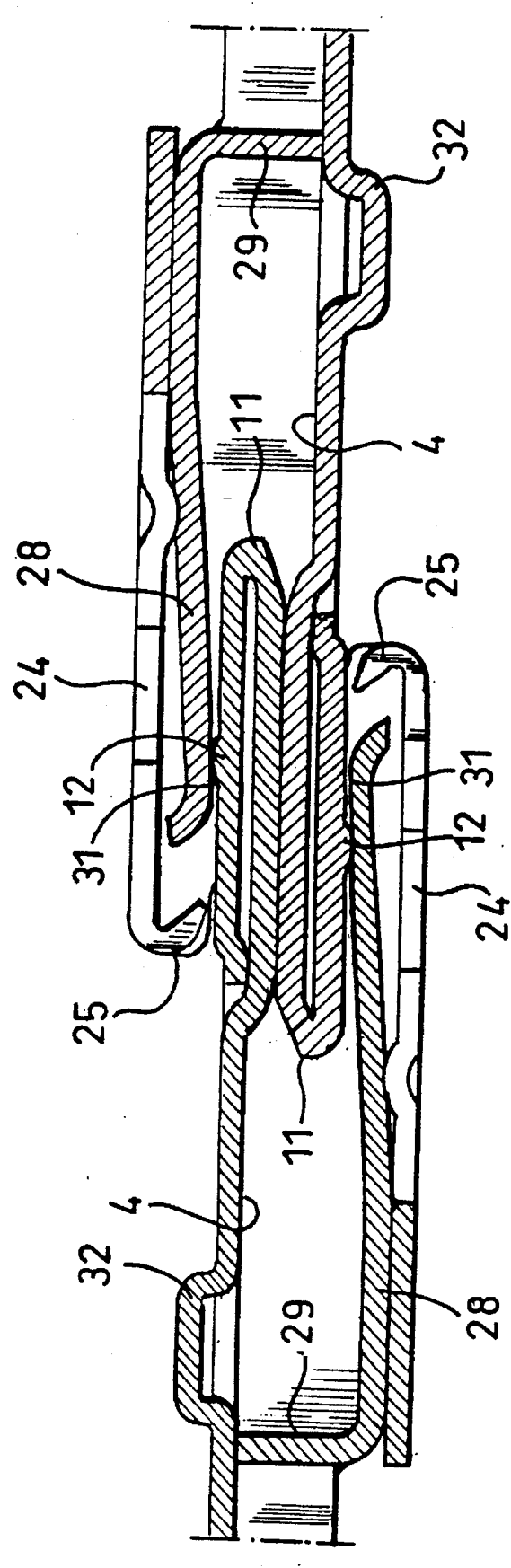
FIG. 9 is a view in section corresponding to FIG. 3 and showing two contact members assembled together.

FIGS. 1 through 9 show a first embodiment of the invention.

The electrical contact member is made from a metal blank. The metal is a good conductor of electricity and has some elasticity.

The blank is cut out so as to have a body 1 with at one end lugs 2 for crimping an insulated electrical conductor and lugs 3 for crimping a bared end of said conductor.

The blank is bent to a shape which has a floor wall 4, two lateral walls 5 and 6 and a ceiling wall 7 defining a rectangular channel section 14.

The floor wall 4 is extended towards the front by a strip 10 which is bent against its outside face, the parts of the floor wall and the strip in contact being stamped to stiffen them and form a male tongue 11 with a boss 12 facing towards the inside of the channel 14.

The lateral wall 5 has a notch 15 at the same end as the strip 10. The lateral wall 6 has a corresponding notch 17.

An opening 16 is formed in the floor wall 4 and the lateral wall 5 for fixing the member into a casing element.

On the side opposite the floor wall 4, the lateral wall 5 has an extension 19 which forms part of the ceiling wall 7, said extension having a notch 22 along its free edge.

On the side opposite the floor wall 4, the lateral wall 6 has an extension 20 which forms the complementary part of the ceiling wall 7, said extension having a notch 24 along its free edge which, with the notch 22, forms an opening for fixing the member into a casing element.

At the end opposite the crimping lugs 2 and 3, the extensions 19 and 20 end in respective guides 23 and 25 to be bent towards the inside of the channel 14.

Along its free edge opposite the guide 25, the extension 20 has a lug 27 joining said extension 20 to a resilient contact arm 28.

At the same end as the crimping lugs 2 and 3 the contact arm 28 has a plate 29. It also has a boss 31 level with the boss 12.

A polarizer member 32 formed by a projection in the floor wall 4 prevents incorrect insertion of the contact member into a housing in a casing.

The figures show that the part 27 is bent until the resilient contact arm lies inside the channel 14, the plate 29 being bent at a right-angle to close off the channel. The contact arm 28 is curved and extends towards the tongue 11.

A stamped portion 30 on the ceiling wall 7 enhances the elastic action of the arm 28.

The contact member is adapted to cooperate with a reversed and inverted identical member (see FIG. 9), the male tongue 11 of each member being inserted in the channel 14 between the male tongue 11 of the other member and the resilient contact arm 28. The guides 24 and 25 oppose the insertion of a tongue whose thickness is greater than that allowed, facilitates the insertion of the tongue and protects the arm 28.

Figure 10:
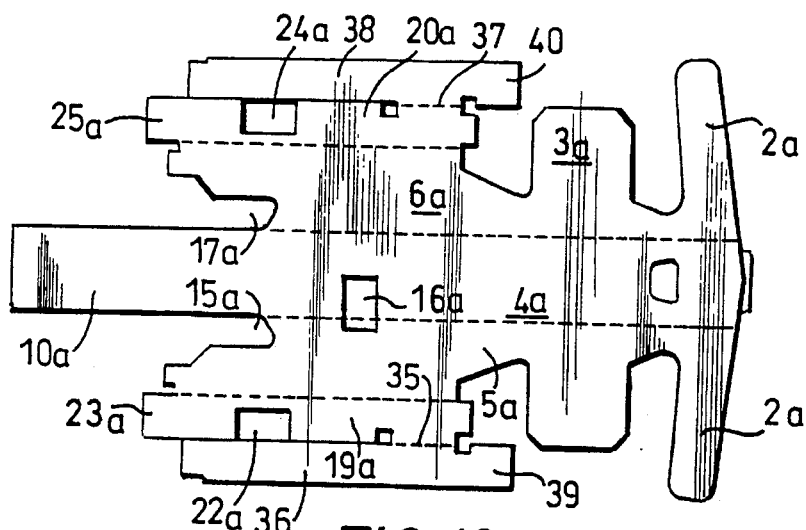
FIG. 10 is a plan view showing how a metal blank is cut out to form an alternative embodiment of hermaphroditic electrical contact member in accordance with the invention.
Figure 11:
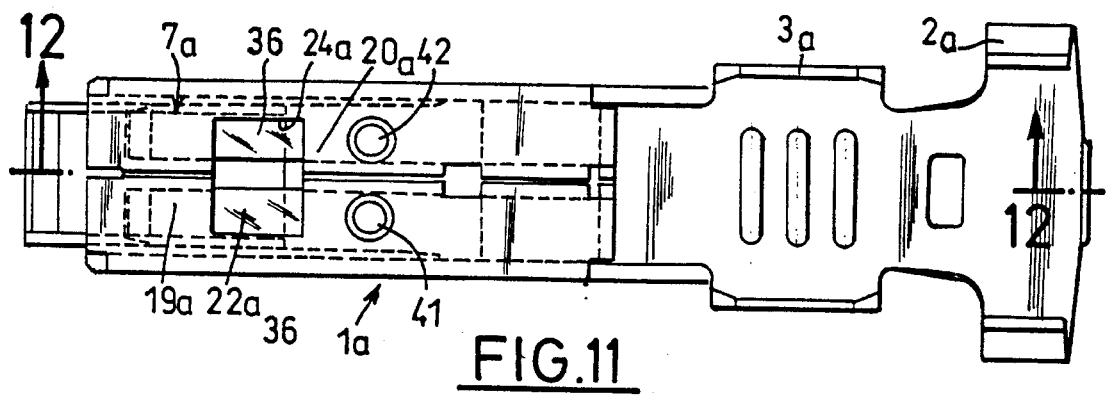
FIG. 11 is a plan view of the contact member made from the FIG. 10 blank.
Figures 12, 13:
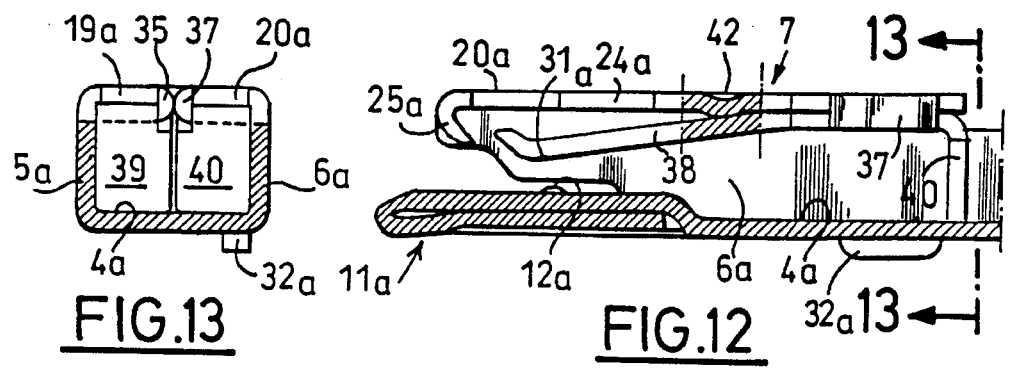
FIG. 12 is a view in section on the line 12—12 in FIG. 11.
FIG. 13 is a view in section on the line 13—13 in FIG. 12.

FIGS. 10 through 18 show a different embodiment of the invention.

In these figures parts corresponding to those of the previous figures are identified by the same reference number with the suffix "a".

In this embodiment, the extension 19a is joined by a lug 35 to a resilient contact arm 36 and the extension 20a has a lug 37 integral with a resilient contact arm 38.

The arms 36 and 38 are bent inside the channel 14a and curved appropriately.

At the same end as the crimping lugs 2a and 3a the arms 36 and 38 have respective plates 39 and 40 bent to form the channel 14.

The extensions 19a and 20a include respective stamped portions 41 and 42 respectively cooperating with the arm 36 and the arm 38.

This embodiment of the hermaphroditic electrical contact member is used in the same way as that of the previous figures, reversed and inverted, each tongue 11a of one member being inserted between the tongue 11a of the other member and the two elastic wedging strips 36 and 38.

Of course, the invention is not limited to the embodiments just described and shown. Numerous modifications of detail can be made thereto without departing from the scope of the invention.

There is claimed:

1. A hermaphroditic electrical contact member, comprising a body having a rectangular section to form a channel therein, said body comprising:

means for fixing an electrical conductor;

a floor wall extended at an end opposite said electrical conductor fixing means, said floor wall being extended at a free end by a strip bent against an outside face of said floor wall to form a male tongue;

two lateral walls formed by extensions of said floor wall, each of said two lateral walls being formed in a plane generally perpendicular to said floor wall;

a ceiling wall formed from extensions of said two lateral walls being bent to extend parallel to said floor wall in a common plane; and a resilient contact arm bent along a lug in at least one of said extensions of said two lateral walls forming said ceiling wall to lie inside said channel, said resilient contact arm being curved so that a free end of said resilient contact arm is directed towards said male tongue extending inside said channel, wherein said at least one of said extensions of each of said two lateral walls is joined to said resilient contact arm by said lug at a point partway along said resilient contact arm.

2. The hermaphroditic electrical contact member according to claim 1, wherein said resilient contact arm is extended by a plate which is bent to contact with an inside face of one of said two lateral walls and said floor wall, in order to close said channel at the same end of said body as said electrical conductor fixing means.

3. The hermaphroditic electrical contact member according to claim 1, said ceiling wall further comprising:

a stamped portion forming a projection inside said channel, said stamped portion being positioned near said lug on a side opposite said electrical conductor fixing means, wherein said resilient contact arm abuts said stamped portion.

4. The hermaphroditic electrical contact member according to claim 1, wherein said floor wall includes an opening, said opening extending into one of said two lateral walls.

5. The hermaphroditic electrical contact member according to claim 1, wherein said strip and a portion of said floor wall which is contacted by said strip being bent against the outside face of said floor wall are stamped.

6. The hermaphroditic electrical contact member according to claim 1, comprising a plurality of resilient contact arms, wherein each of said plurality of resilient contact arms is bent along a respective lug in a respective one of said extensions of said two lateral walls forming said ceiling wall to lie inside said channel, each of said plurality of resilient contact arms being curved so that a free end of each of said plurality of resilient contact arms is directed towards said male tongue extending inside said channel, and wherein each of said extensions of said two lateral walls are joined to a respective one of said plurality of resilient contact arms by said respective lug at a point partway along said respective one of said plurality of resilient contact arms.

* * * * *